(12) United States Patent
Riazantsev et al.

(10) Patent No.: US 10,724,382 B2
(45) Date of Patent: Jul. 28, 2020

(54) GAS TURBINE COOLING SYSTEMS AND METHODS

(71) Applicant: ANSALDO ENERGIA SWITZERLAND AG, Baden (CH)

(72) Inventors: Sergei Riazantsev, Nussbaumen (CH); Stefan Rofka, Nussbaumen (CH); Robert Marmilic, Rieden (CH); Hanspeter Knopfel, Dottikon (CH); Sergey Shchukin, Mellingen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 672 days.

(21) Appl. No.: 15/235,975

(22) Filed: Aug. 12, 2016

(65) Prior Publication Data

US 2017/0044909 A1 Feb. 16, 2017

(30) Foreign Application Priority Data

Aug. 14, 2015 (EP) .................................... 15181025

(51) Int. Cl.
*F01D 5/18* (2006.01)
*F01D 11/00* (2006.01)
(Continued)

(52) U.S. Cl.
CPC .............. *F01D 5/187* (2013.01); *F01D 5/082* (2013.01); *F01D 5/3007* (2013.01);
(Continued)

(58) Field of Classification Search
CPC ........ F01D 5/187; F01D 5/082; F01D 5/3007; F01D 5/188; F01D 11/001; F01D 11/02; F01D 11/22; F02C 3/04; F02C 7/12
See application file for complete search history.

(56) References Cited

U.S. PATENT DOCUMENTS

| 3,768,924 A | 10/1973 | Corsmeier et al. |
| 3,989,410 A * | 11/1976 | Ferrari .................. F01D 3/00 415/115 |

(Continued)

FOREIGN PATENT DOCUMENTS

| CN | 102282338 A | 12/2011 |
| DE | 11 06 557 B | 5/1961 |

(Continued)

OTHER PUBLICATIONS

Search Report dated May 12, 2016, by the European Patent Office for Application No. 15181025.6.

(Continued)

*Primary Examiner* — Craig Kim
(74) *Attorney, Agent, or Firm* — Buchanan Ingersoll & Rooney PC

(57) ABSTRACT

A gas turbine having a compressor, a combustor downstream from the compressor in a gas flow direction, and a turbine downstream from the combustor in the gas flow direction is described herein. The turbine includes a rotating part and a stationary part arranged around the rotating part. A gap between the rotating part and the stationary part, extends in a substantially radial direction relative to the rotation axis of the rotating part. A cooling fluid flows from the compressor to the gap, wherein at least a part of the cooling path extends in the stationary part, and wherein a pre-swirl nozzle is arranged adjacent to the gap and within the cooling path in the stationary part.

12 Claims, 7 Drawing Sheets

(51) Int. Cl.
- *F01D 5/08* (2006.01)
- *F01D 5/30* (2006.01)
- *F01D 11/02* (2006.01)
- *F02C 3/04* (2006.01)
- *F02C 7/12* (2006.01)

(52) U.S. Cl.
CPC ............ *F01D 11/001* (2013.01); *F01D 11/02* (2013.01); *F02C 3/04* (2013.01); *F02C 7/12* (2013.01); *F05D 2220/32* (2013.01); *F05D 2260/14* (2013.01); *F05D 2260/2212* (2013.01); *Y02E 20/16* (2013.01)

(56) References Cited

U.S. PATENT DOCUMENTS

| | | | | |
|---|---|---|---|---|
| 4,375,891 | A * | 3/1983 | Pask | F01D 11/025 277/384 |
| 5,472,313 | A * | 12/1995 | Quinones | F01D 5/082 415/115 |
| 5,511,945 | A * | 4/1996 | Glezer | F01D 5/081 416/219 R |
| 5,800,125 | A * | 9/1998 | Largillier | F01D 5/081 416/96 R |
| 6,077,035 | A * | 6/2000 | Walters | F01D 5/081 415/115 |
| 6,787,947 | B2 * | 9/2004 | Coulon | F01D 5/081 310/52 |
| 2006/0222486 | A1 * | 10/2006 | Maguire | F01D 5/081 415/116 |
| 2006/0269400 | A1 * | 11/2006 | Girgis | F01D 5/081 415/115 |
| 2011/0247345 | A1 | 10/2011 | Laurello et al. | |
| 2011/0274536 | A1 | 11/2011 | Inomata et al. | |
| 2012/0111020 | A1 | 5/2012 | Bozzi et al. | |
| 2012/0128473 | A1 | 5/2012 | Szwedowicz et al. | |
| 2014/0248133 | A1 * | 9/2014 | Ebert | F01D 17/105 415/145 |
| 2016/0090855 | A1 * | 3/2016 | Judet | F01D 5/082 416/189 |
| 2016/0108748 | A1 * | 4/2016 | Harris | F01D 9/042 415/177 |
| 2016/0376891 | A1 * | 12/2016 | Bricaud | F01D 5/081 416/1 |

FOREIGN PATENT DOCUMENTS

| | | |
|---|---|---|
| DE | 198 54 907 A1 | 5/2000 |
| EP | 2 381 066 A1 | 10/2011 |
| EP | 2 439 390 A1 | 4/2012 |
| EP | 2 455 584 A1 | 5/2012 |
| GB | 2 109 871 A | 6/1983 |
| GR | 2010 0100 340 A | 1/2012 |
| JP | 61-250304 A | 11/1986 |

OTHER PUBLICATIONS

Office Action dated Aug. 30, 2019 in corresponding Chinese Patent Application No. 201610666269.2 with English Translation, 15 pages.

* cited by examiner

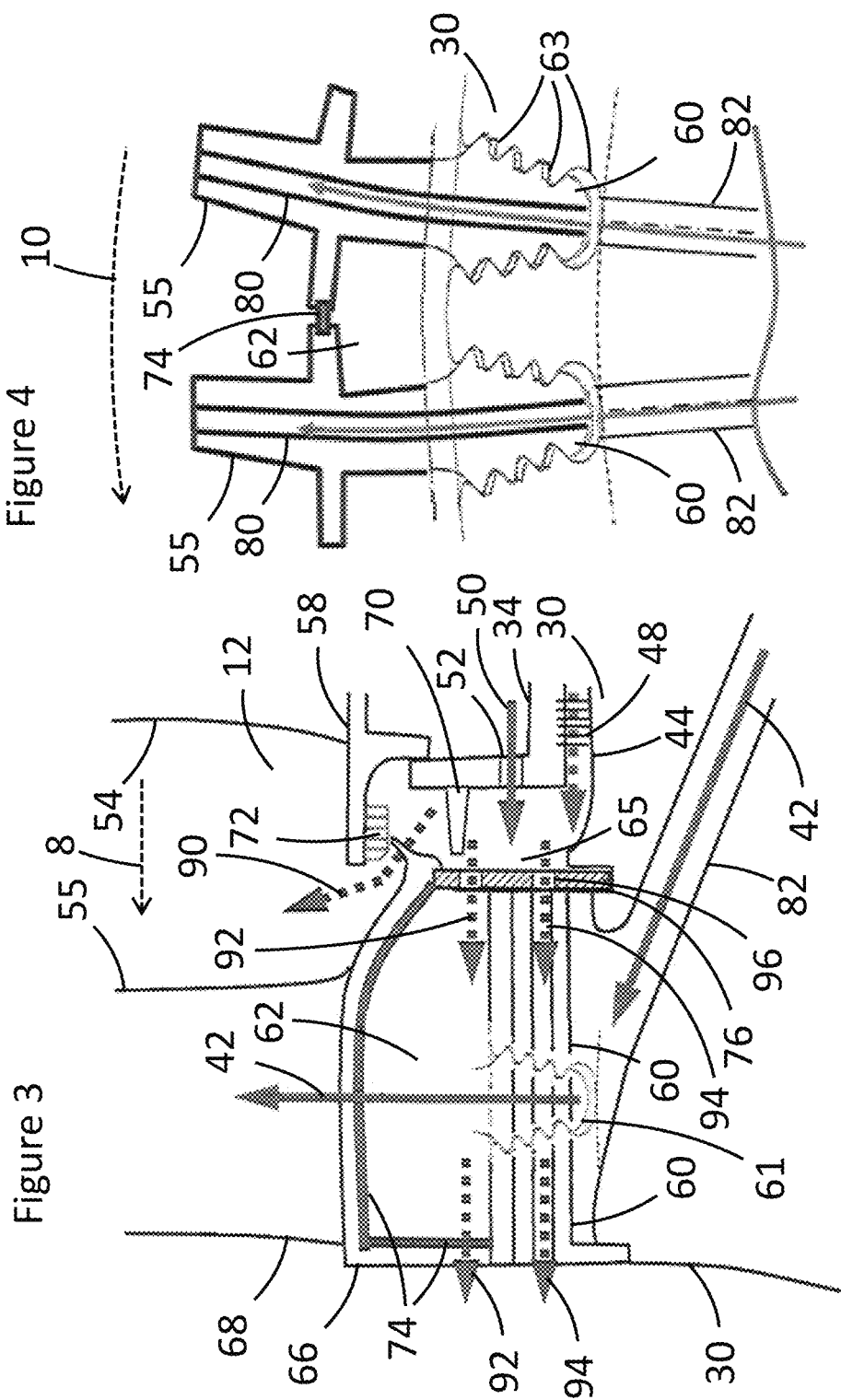

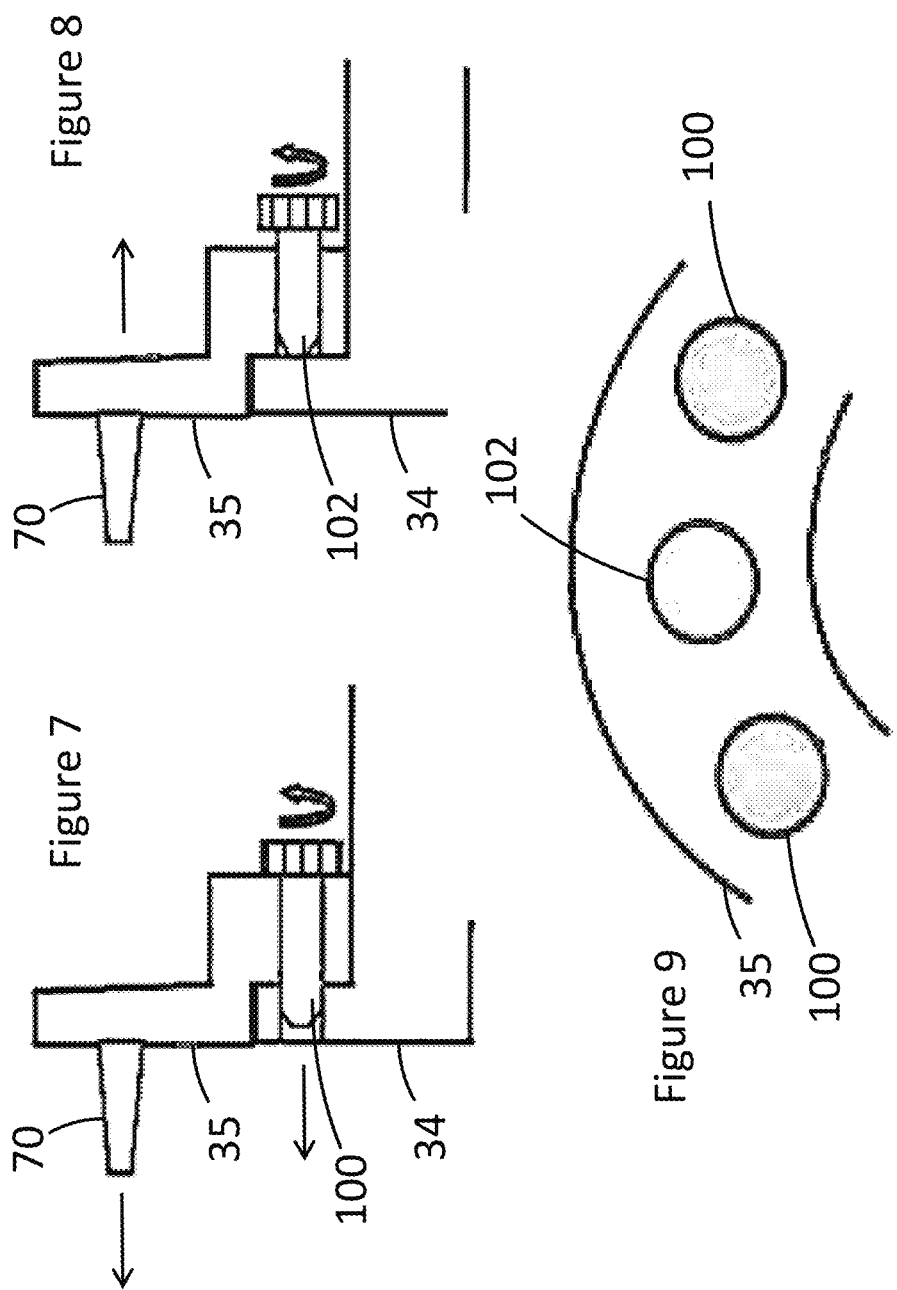

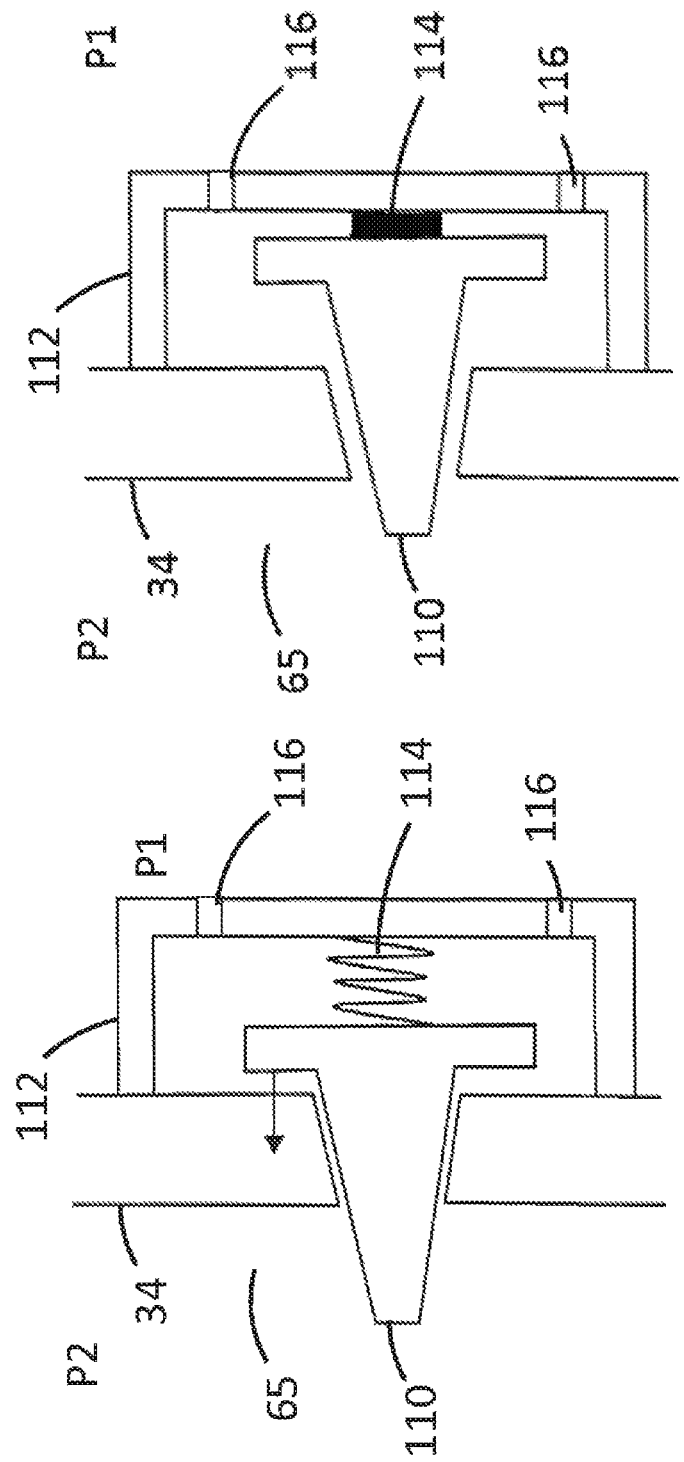

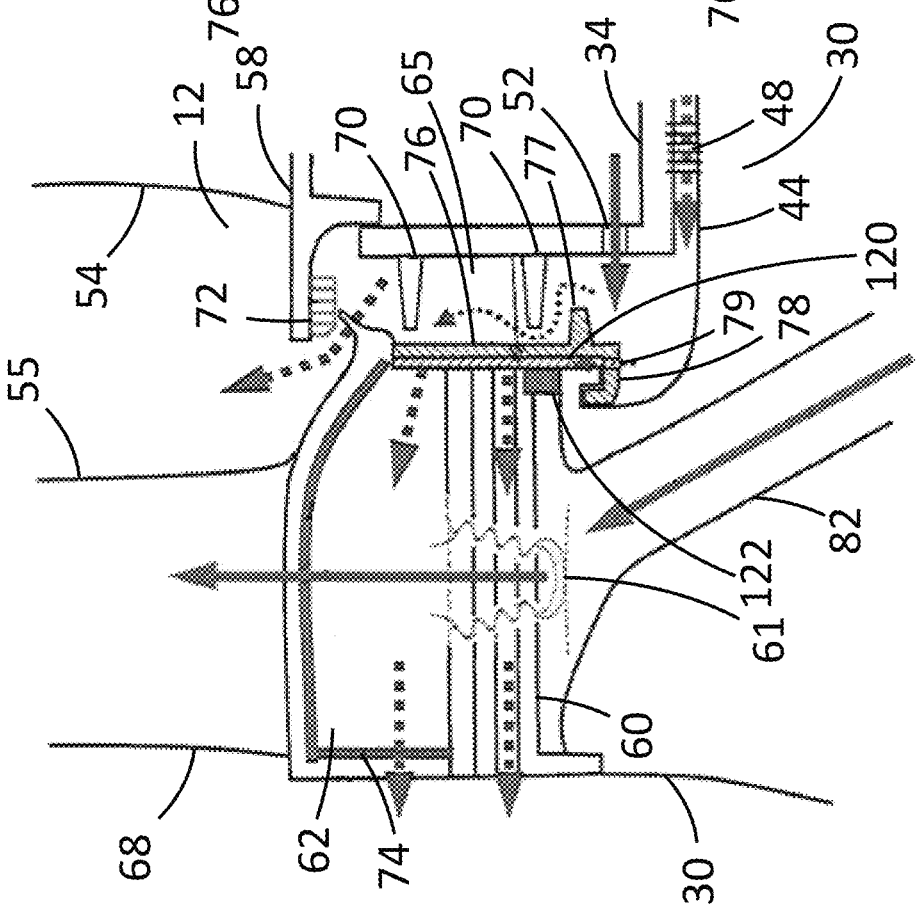

GAS TURBINE COOLING SYSTEMS AND METHODS

TECHNICAL FIELD

The present disclosure relates to gas turbines comprising cooling paths, and particularly to gas turbines comprising a cooling path with a pre-swirl nozzle arranged adjacent to a gap extending between the first blade and the rotor casing.

BACKGROUND OF THE INVENTION

State-of-the-art gas turbines, particularly the heavy-duty gas turbines used to generate a significant percentage of the world's energy supply, require a substantial amount of cooling to stop various components from melting.

An area of particular importance in terms of cooling is the first blade in the turbine of a gas turbine. In addition to being subjected to very high temperatures, the first blade is also subject to high mechanical load due to rotation.

The root of the first blade is a fir tree, and the fir tree is attached to the rotor of the gas turbine. The combination of high temperature and high load tends to limit the lifetime of the fir tree. As a result it has been appreciated that the cooling of the fir tree could usefully be improved.

SUMMARY OF THE INVENTION

The invention is defined in the appended independent claims to which reference should now be made. Advantageous features of the invention are set forth in the dependent claims.

A first aspect provides a gas turbine comprising a compressor, a combustor downstream from the compressor in a gas flow direction, and a turbine downstream from the combustor in the gas flow direction, the turbine comprising a rotating part and a stationary part arranged around the rotating part, the rotating part comprising a rotor and a blade, the blade comprising a fir tree at a root end of the blade, the blade being attached to the rotor by the fir tree the turbine comprising a gap between the rotating part and the stationary part, the gap extending between the blade and the stationary part in a substantially radial direction relative to the rotation axis of the rotating part, the gas turbine comprising a cooling path configured and arranged to direct a cooling fluid from the compressor to the gap, wherein at least a part of the cooling path extends in the stationary part, and wherein a pre-swirl nozzle is arranged adjacent to the gap and within the cooling path in the stationary part.

Providing a pre-swirl nozzle at this location can reduce the temperature of the cooling air entering the fir tree and the blade root cavity. As a result, pre-swirl nozzle can reduce or remove the need for an external air cooler to cool the cooling air for the blade 1 fir tree. Alternatively or additionally, the pre-swirl nozzle can help reduce the blade 1 fir-tree temperature, and can therefore help increase part lifetime. Alternatively or additionally, the pre-swirl nozzle can help reduce the amount of cooling air (normally re-cooled cooling air) required in the blade 1 fir tree. Alternatively or additionally, the pre-swirl nozzle can reduce or remove the need for an external cooler.

Cooling air that has passed through a rotor-stator cooling air path to the gap (blade 1—rotor casing gap) will normally be hotter than cooling air that has been fed partly or entirely through the rotor casing. As a result, cooling air taking the stator cooling air path can provide a greater cooling effect than cooling air that has passed through a rotor-stator cooling air path. This can allow for a reduced flow of cooling air while still providing the same cooling effect, or can allow for increased cooling. Increased cooling can result in an improved fir-tree lifetime.

The pre-swirl nozzle can help to reduce the velocity difference (tangential component) between the airflow and the rotor, into which the cooling fluid passes. This can increase the amount of air delivered to the blades for a given pressure drop and can reduce the temperature of the air delivered to the blade (compared to a design without a pre-swirl nozzle).

Preferably, the stationary part comprises a rotor casing. In an embodiment, the stationary part comprises the rotor casing 34 and vane 1, and the gap 65 extends between the first blade and at least one of the rotor casing 34 and vane 1. At least part of the cooling path 50 extends in at least one of the rotor casing 34 and vane 1. The pre-swirl nozzle is arranged in at least one of the rotor casing 34 and vane 1.

One embodiment provides a sealing fin attached to the rotor casing, the vane or the rotating part and extending into the gap. The sealing fin can split the vortex in the gap (see FIG. 5). Due to the vortex, some hot gas from the hot gas path is sucked into the gap. When the vortex is split into two parts by the sealing fin, a substantial part of the sucked-in hot gas will stay in the outer vortex (the vortex further from the rotation axis) and the air temperature in the vicinity of the rotor fir tree will normally be reduced compared to a design without a sealing fin.

Preferably, the sealing fin is moveable in the direction of the rotation axis. Providing a moveable sealing fin can help simplify gas turbine assembly and disassembly.

One embodiment provides a pneumatic system configured and arranged to move the sealing fin in the direction of the rotation axis. One embodiment provides bolts that are configured and arranged to move the sealing fin in the direction of the rotation axis.

Preferably, the bolts comprise a first type of bolt and a second type of bolt, configured and arranged so that when the first type of bolt is tightened it can move the sealing fin towards the blade, and when the second type of bolt is tightened it can move the sealing fin away from the blade. This can help simplify gas turbine assembly and disassembly.

One embodiment provides a sealing plate extending adjacent to the fir tree on the side of the gap opposite the rotor casing, the sealing plate comprising at least one hole configured and arranged to allow cooling fluid from the gap to enter a fir tree cooling channel, wherein the fir tree cooling channel is arranged between the rotor and the fir tree. This can help seal the fir tree and can help purge the blade 1 fir tree (stage 1 fir tree) with cooling air.

One embodiment provides at least one rib attached to the side of the sealing plate adjacent to the fir tree. A rib can increase the cooling fluid pressure, when compared to the same design but with the rib removed. The rib can guide air into the fir tree cooling channels.

One embodiment provides a second cooling path extending between the rotor and the rotor casing, the second cooling path configured and arranged to direct cooling air to cool an aerofoil of the blade. One embodiment provides a second pre-swirl nozzle in the second cooling path. This provides further cooling.

One embodiment provides an external cooler, and the cooling path extends through the external cooler. The cooling potential of the cooling air can be increased using an external cooler.

Preferably, the pre-swirl nozzle is at the same distance as the fir tree from the rotation axis of the gas turbine.

A second aspect provides a rotor casing for a gas turbine, the rotor casing being configured and arranged as described above, and the rotor casing being configured and arranged to be used in a gas turbine as described above. This can provide a rotor casing that can be retrofitted into existing gas turbines.

A third aspect provides a method of cooling for a gas turbine, the method comprising the steps of providing a gas turbine as described above, and feeding cooling fluid from the compressor to the gap through the pre-swirl nozzle. Preferably, the cooling fluid is fed from the gap to at least one of a blade shank cavity adjacent to the blade, a hot gas path in the turbine and a fir tree cooling channel between the fir tree and the rotor.

BRIEF DESCRIPTION OF THE DRAWINGS

An embodiment of the invention will now be described by way of example only and with reference to the accompanying drawings in which:

FIG. 3 shows further detail of part of the cross-section of the gas turbine of FIG. 1;

FIG. 4 shows a cross-section along line IV-IV of FIG. 2;

FIG. 7 shows a cross-section of part of a gas turbine, showing a type of assembly bolt;

FIG. 8 shows a cross-section of part of a gas turbine, showing a type of disassembly bolt;

FIG. 9 shows a cross-section of part of a rotor casing, showing the relative position of bolts in the circumferential direction;

FIG. 10 shows a cross-section of a pneumatic system with a pneumatic moveable sealing fin, during use;

FIG. 11 shows the embodiment of FIG. 10 when the gas turbine is off;

FIG. 12 shows a cross-section of part of a gas turbine in another embodiment;

FIG. 13 shows a rib structure for the sealing plate of FIG. 12; and

FIG. 14 shows another rib structure for the sealing plate of FIG. 12.

DETAILED DESCRIPTION OF THE PREFERRED EMBODIMENTS

Figure 1:
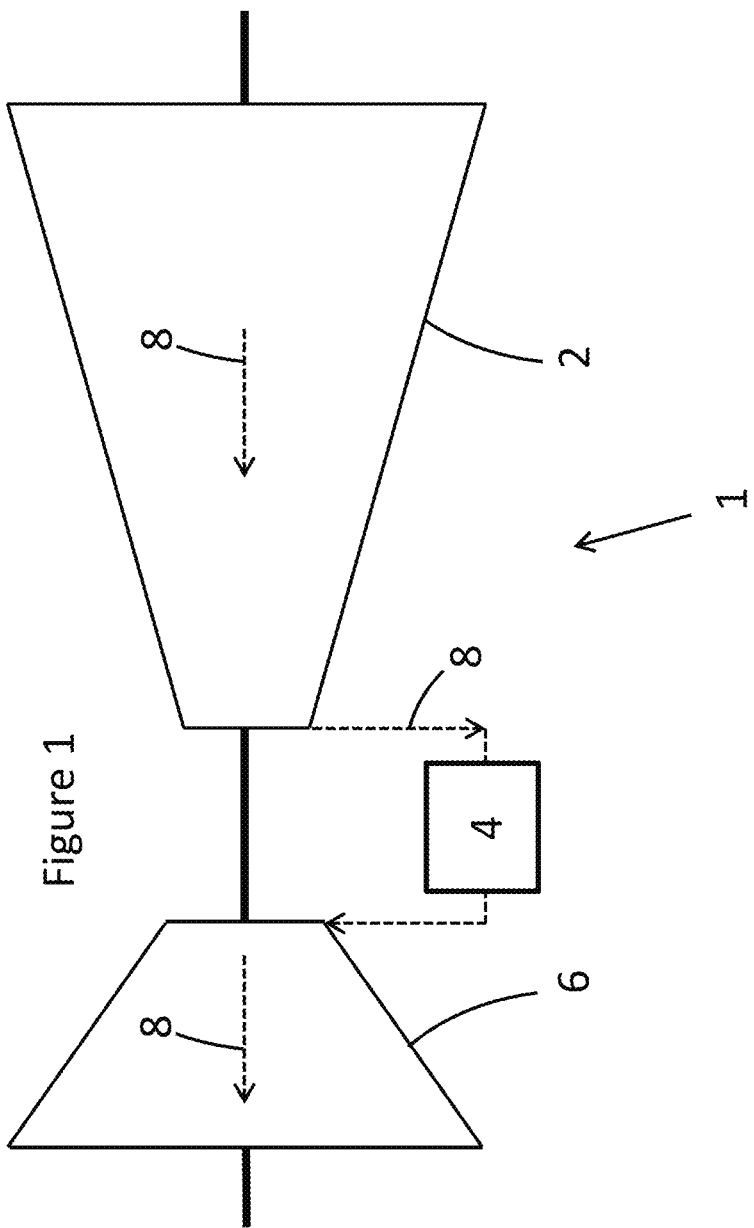
FIG. 1 shows a cross-section of a gas turbine.

FIG. 1 shows a gas turbine 1 comprising a compressor 2, a combustor 4 downstream from the compressor 2 in a gas flow direction 8 and a turbine 6 downstream from the combustor 4 in the gas flow direction 8.

Figure 2:
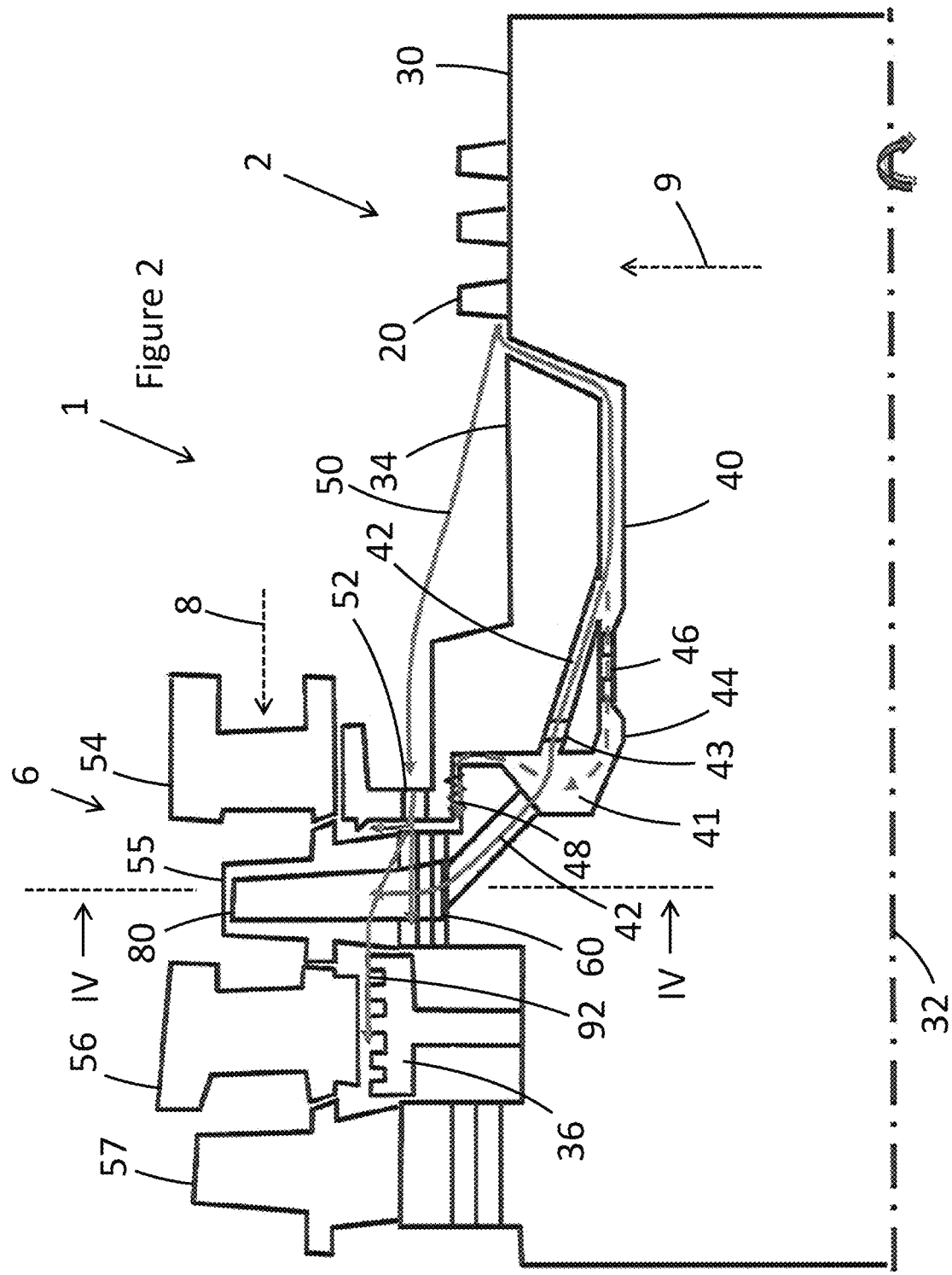
FIG. 2 shows a cross-section of part of a gas turbine comprising the cooling scheme of the present invention.

FIG. 2 shows a gas turbine 1 in more detail. The compressor 2 comprises a plurality of blades 20 and vanes (not shown). A rotor 30 (rotor drum) extends along a rotation axis 32 of the gas turbine 1. A rotor casing 34 (rotor cover) extends around the rotor 30.

A stator cooling air path 50 is configured and arranged to direct cooling air from the compressor 2 to the turbine blade 55; the exact path taken is not shown. A pre-swirl nozzle 52 is arranged in the stator cooling air path in the rotor casing 34. The stator cooling air path could alternatively or additionally pass through a first vane 54.

The turbine 6 comprises the first vane (vane 1) 54, a first blade 55 (blade 1), a second vane 56 (vane 2) and a second blade 57 (blade 2). The first blade 55 comprises a fir tree 60 at its root end. The fir tree is shaped so as to slot into an appropriately shaped part of the rotor 30 (see FIG. 4). The pre-swirl nozzle 52 in the stator cooling air path 50 is adjacent to the fir tree 60 and at the same or substantially the same distance as the fir tree 60 from the rotation axis 32. The turbine 6 comprises a rotating part (including the rotor, blade 1 and blade 2) and a stationary part (including the rotor casing, vane 1 and vane 2).

A rotor cooling air path 40 extends between the rotor 30 and the rotor casing 34, before splitting into a blade 1 internal cooling air path 42 and a rotor-stator cooling air path 44. These two cooling paths 42, 44 normally go through a cavity 41 in front of the turbine first stage disk (part of the rotor). Seals 46, 48 are normally arranged in the rotor-stator cooling air path 44. The rotor-stator cooling air path 44 leads to a blade 1—rotor casing gap 65 (see FIG. 3). A second pre-swirl nozzle 43 is optionally arranged in the blade 1 internal cooling air path 42, before the cavity 41.

FIG. 3 shows further detail of blade 1 and the gap 65 between blade 1 and the rotor casing; the blade 1—rotor casing gap 65 is the gap primarily extending between blade 1 on one side and the rotor casing on the other side. A sealing fin 70 (generally a moveable sealing fin) is attached to the rotor casing 34 and extends into the blade 1—rotor casing gap 65. A honeycomb seal 72 is attached to vane 1 and extends into the blade 1—rotor casing gap at the point where the blade 1—rotor casing gap ends and the main hot air path through the blades and vanes begins. A sealing plate 76 extends across the front end of the fir tree 60 and a blade shank cavity 62, to restrict and control the flow of cooling air from the blade 1—rotor casing gap 65 into the fir tree 60 and the blade shank cavity 62. Cooling air 92, 94 can pass through cooling air holes 96 in the sealing plate 76. A rotor bore 82 can feed cooling air to the blade cooling air channel 80 (see FIG. 4); the blade 1 internal cooling air path 42 shown in FIG. 2 feeds through the rotor bore 82 into the blade cooling air channel 80. A rotated fir tree view 61 is also shown superimposed on FIG. 3, showing an outline of a side view of the fir tree 60 for reference.

FIG. 4 shows a circumferential cross-section at the axial position of blade 1. FIG. 4 shows blade cooling air channels 80, which pass through the blade 55 from the fir tree 60, taking cooling air from the rotor bore 82. Fir tree cooling channels 63 are also shown in FIG. 4. The fir tree cooling channels are between the rotor 30 and the fir tree 60.

The blade shank cavity 62 can be seen in FIG. 3 and FIG. 4, and extends between adjacent blades in the circumferential direction 10. Sealing strips 74 help seal the blade shank cavity, along with the sealing plate 76. A second sealing plate (not shown) may be provided at the distal end (back end) of the fir tree 60 from the sealing plate 76. Cooling air holes would normally be provided in the second sealing plate to allow cooling air 92, 94 to pass through.

Figure 5:
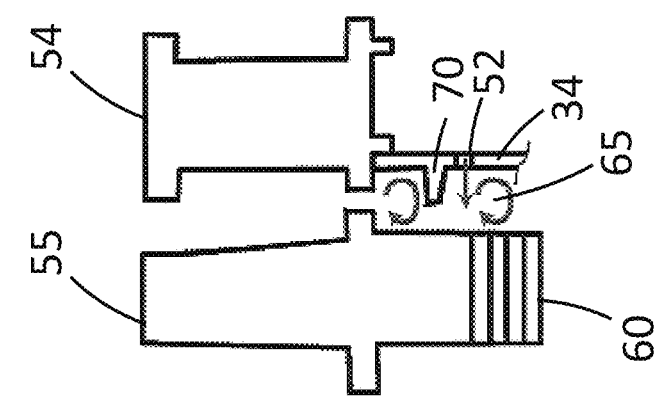
FIG. 5 shows a cross-section of part of a gas turbine in another embodiment.

FIG. 5 shows an example of a rotor casing 34, a first vane 54 and a first blade 55, delineating a blade 1—rotor casing gap 65. A sealing fin 70 extends part of the way across the blade 1—rotor casing gap from the rotor casing 34. Arrows within the blade 1—rotor casing gap 65 show a typical cooling air circulation pattern within the gap. Without the sealing fin 70, there would normally be a single vortex in the cavity rather than the two shown in FIG. 5. With a single vortex, some of the air in the gap can be taken from the pre-swirl nozzle 52 and pulled up into the hot gas path, rather than going into the fir tree. A single vortex can also bring hot gas from the hot gas path down towards the fir tree area. As both of these consequences are generally undesirable, it is generally preferable to include a sealing fin 70.

Figure 6:
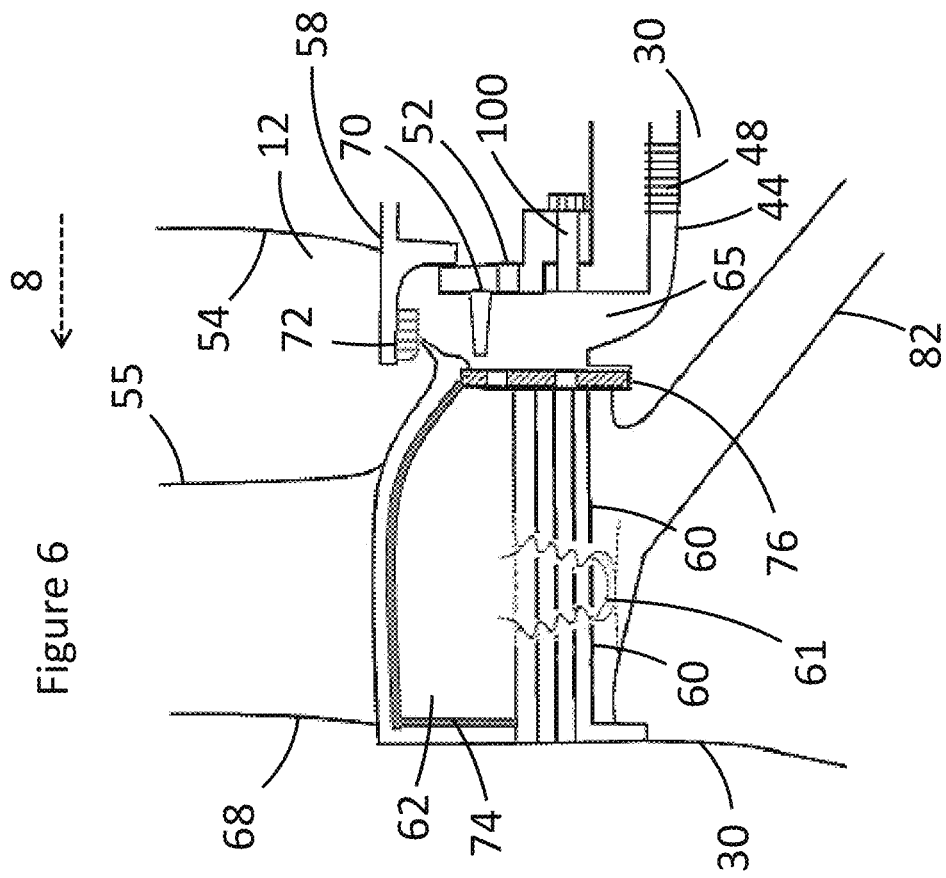
FIG. 6 shows a cross-section of part of a gas turbine in a third embodiment.

FIG. 6 shows details of apparatus for moving the sealing fin 70, which are enlarged in FIGS. 7 to 9. In FIG. 7, the rotor casing 34 has a moveable portion 35 that is moveable relative to the rest of the rotor casing. The moveable portion 35 is slidably attached to the main rotor casing 34 by a bolt 100. The bolt is attached to the moveable portion so that when the bolt 100 is tightened, normally during engine assembly, the moveable portion 35 and the bolt 100 move in the direction shown by the arrows; that is, the bolt 100 moves in the axial direction relative to the rotor casing 34, and remains in the same place relative to the moveable rotor casing portion 35. The moveable sealing fin 70 is attached to the moveable portion 35. As a result, the moveable sealing fin can be moved into the blade 1—rotor casing gap 65 during engine assembly by tightening (tensioning) the bolt 100.

Further bolts can be spaced in the circumferential direction around the rotor casing. Multiple assembly bolts 100 (a first type of bolt) can be provided, interspersed with disassembly bolts 102 (a second type of bolt) in various patterns (see FIG. 9, for example). In FIG. 8, a disassembly bolt 102 is shown. The disassembly bolt 102 is fixed relative to the fixed part of the rotor casing 34 and when turned (tensioned) can move the moveable sealing fin 70 and moveable portion 35 relative to the fixed part of the rotor casing 34. That is, the disassembly bolt 102 can move the moveable sealing fin 70 and moveable portion 35 away from the blade 55, i.e. in the opposite direction to the direction achieved by tensioning the assembly bolt 100. During disassembly, the assembly bolt 100 should be loosened, after which the disassembly bolt can be tensioned to move the moveable sealing fin 70, moveable portion 35 and assembly bolt 100 away from the blade 55.

In a method of engine disassembly, the disassembly bolts 102 can be used (tensioned) to move the moveable fin away from blade 1 in the axial direction so as to allow removal of the rotor casing without removal of blade 1. Without moving the moveable fin away in this fashion, the rotor casing would not normally be able to pass blade 1.

FIG. 10 shows another type of moveable sealing fin, namely a pneumatic moveable sealing fin 110. In this design, a housing 112 is attached to the rotor casing 34, and a spring 114 is attached to the rotor casing 34, with the pneumatic moveable sealing fin 110 attached to the housing 112 by the spring 114. The pneumatic moveable sealing fin 110 extends through a gap in the rotor casing 34. At least one hole 116 is provided in the housing 112, through which air can pass.

During operation of the gas turbine, the pressure is higher upstream of the pneumatic moveable sealing fin 110 (pressure P1) than downstream of the pneumatic moveable sealing fin 110 (pressure P2) in the blade 1—rotor casing gap 65. As a result, the length of the spring increases and the pneumatic moveable sealing fin 110 is pushed out into the blade 1—rotor casing gap 65.

For comparison, FIG. 11 shows the position of the pneumatic moveable sealing fin 110 when the gas turbine is off and P1 and P2 are the same or are almost the same.

FIG. 12 shows another example. In this example, the sealing plate 76 has a sealing fin 77 and a hooked portion 78, where it hooks around a part of the rotor 30. A cooling air hole 79 is provided in the sealing plate 76. At least one rib 120 is attached to the sealing plate 76 on the side of the sealing plate facing towards the fir tree 60. Two sealing fins 70 are provided, spaced apart in the radial direction 9; these are optional.

FIGS. 13 and 14 show possible configurations for the ribs 120, with straight ribs extending in the radial direction 9 in FIG. 13 and with curved ribs in FIG. 14. The shape of the ribs can be adjusted during a design phase based on the tangential velocity of the air near the sealing plate entry. The ribs 120 are optional. Preferably, the pressure in the blade shank cavity is slightly higher than the pressure of the hot gas in the hot gas path at the blade 1 leading edge. The ribs 120 can increase pressure in the blade shank cavity.

In a method of cooling a gas turbine as described above, a gas turbine (1) as described above is provided, and cooling fluid (50) is fed from the compressor (2) to the gap (65) through the pre-swirl nozzle (52).

Cooling air is bled off from the compressor at one or more bleed-off points. From this air, cooling air is fed to various parts of the gas turbine. Various different cooling air paths are possible, but in the example in the Figures, the cooling air is fed as follows.

From the compressor, two different cooling air paths are followed. Firstly, cooling air is fed to the pre-swirl nozzle 52 and secondly, cooling air is fed to the rotor cooling air path 40 between the rotor 30 and the rotor casing 34.

Cooling fed through the rotor cooling air path 40 is fed in two separate directions; firstly, to the blade 1—rotor casing gap 65 via the rotor-stator cooling air path 44, and secondly to the blade cooling air channel 80 via the blade 1 internal cooling air path 42.

Cooling air fed through the pre-swirl nozzle 52 then enters the blade 1—rotor casing gap 65.

Cooling air that enters the blade 1—rotor casing gap then exits in three different ways. Firstly, a portion of the cooling air 90 exits into the hot gas flow. Secondly, another portion of the cooling air 92 exits into the blade shank cavity 62. Thirdly, another portion of the cooling air 94 exits into the fir tree cooling channels 63.

The cooling air 92 that is fed into the blade shank cavity 62 is then fed to the vane 2—rotor heat shield gap. The cooling air 94 may also be used to cool other components after being fed through the fir tree cooling channels 63. There is normally a pressure differential between the blade 1—rotor casing gap 65 and the vane 2—rotor heat shield gap, with the pressure being higher in the blade 1—rotor casing gap. As a result, the cooling air 92, 94 will normally flow through the fir tree and the blade shank cavity naturally, down the pressure gradient. Cooling the vane 2—rotor heat shield gap with this air can reduce cooling air requirements and improve gas turbine efficiency.

The gas turbine described above could be a heavy-duty gas turbine for power generation, but could also be other types of gas turbine. An existing gas turbine could be retrofitted to provide the gas turbine described above. The gas turbine can be part of a combined cycle power plant.

The turbine 6 is shown in FIG. 2 with two sets of vanes and two sets of blades, but may also have one, three or more sets of vanes and blades. Vanes and blades are generally arranged in circumferential rings around the rotor. Stage 1 comprises vane 1 and blade 1, stage 2 comprises vane 2 and blade 2, and so on. As can be seen in FIG. 2, vane 1 is the first vane in the gas flow direction, followed by blade 1, vane 2, and blade 2.

The gas flow direction 8 is the direction of flow of gas through the turbine. In the compressor, the gas is air (or alternatively another gas such as oxygen), and following combustion in the combustor, the gas is a mixture of hot gases including combustion products. In the compressor and the turbine, the hot gas flow is largely parallel to the rotation axis 32 of the gas turbine.

The rotor 30 may be a rotor for the turbine or may extend beyond the turbine to at least one of the compressor and a generator.

The rotor casing 34 normally extends alongside the rotor in the rotation axis direction as shown in FIG. 2, for example. A space, in this case the rotor cooling air path 40 and the rotor-stator cooling air path 44, separates the rotor and the rotor casing. The rotor casing extends to the first vane 54. One or more seals may be provided between the rotor casing and the first vane 54. In the circumferential direction relative to the rotation axis 32, the rotor casing is normally modularised. In the direction of the rotation axis 32, the rotor casing is shown as one integral part in the Figures, but may alternatively be modularised. For example, the portion of the rotor casing adjacent to the blade 1—rotor casing gap 65 may be a separate part from the rest of the rotor casing (i.e. moveable rotor casing portion 35). The moveable rotor casing portion 35 may also be modularised, and may be a ring split up into ring segments.

The various cooling air paths may take paths other than those described above. For example, the cooling air path 40 and the cooling air 50 are shown taking different paths from the compressor, but may initially follow the same path from the compressor before splitting. A cooling air path from the compressor 2 to the first blade 55 can be considered as a second cooling path, following cooling air path 40 and cooling air path 42.

The second pre-swirl nozzle 43 is normally arranged in the rotor casing, at or slightly upstream of the point where the blade 1 internal cooling air path 42 exits the rotor casing.

The seals 46, 48 are generally included but are optional, and instead of two seals, one, three or more seals could be provided. Each of these seals may be a honeycomb seal, a labyrinth seal, or another appropriate type of seal. The seals are shown on portions of the cooling air path 44 that are parallel to the rotation axis 32, but could also be provided on other portions of the cooling air path 44. The flow of cooling air required through the rotor-stator cooling air path may be reduced when compared to a gas turbine without a stator cooling air path; this can be achieved by improving the sealing in the rotor-stator cooling air path. It is generally preferable to minimise the flow through the rotor-stator cooling air path and maximise the flow through the stator cooling air path, as the cooling air passing through the latter is normally cooler.

The stator cooling air path 50 passes through the stator, normally through the rotor casing and/or vane 1, at least where the cooling air is passing through the pre-swirl nozzle 52. The stator cooling air path 50 may pass through a plenum between the rotor casing and the combustor.

In one example, the external cooler can be used to cool the cooling air prior to feeding the cooling air into the fir tree; for example, an external air cooler could be provided to cool part or all of the cooling air in the stator cooling air path, with the cooling air passing through the external air cooler between the compressor 2 and the pre-swirl nozzle 52. The external cooler could be a once-through cooler.

The pre-swirl nozzle 52 is shown in the rotor casing in the examples in the Figures, but could also be arranged in vane 1, specifically in the root portion 58 (see FIG. 3) of vane 1. In such cases, the root portion of vane 1 would normally extend further towards the rotation axis 32 than is shown in the Figures. Vane 1 is normally attached to the rotor casing 34.

The pre-swirl nozzle 52 is arranged in the stator cooling air path 50 and would normally be arranged either at the point where the stator cooling air path joins the blade 1—rotor casing gap 65 (the rotor casing cooling air path exit), or slightly upstream of the stator cooling air path exit relative to the flow direction in the stator cooling air path. The pre-swirl nozzle 52 is generally, though not always (see FIG. 12, for example), arranged directly across the blade 1—rotor casing gap from blade 1. As a result, the pre-swirl nozzle is the same or substantially the same distance as the fir tree (blade 1 fir tree) from the rotation axis in the radial direction 9. That is, at least part of the pre-swirl nozzle is the same distance from the rotation axis as at least part of the fir tree (i.e. they partly overlap in the direction of the rotation axis). Preferably, the entire pre-swirl nozzle is at the same distance from the rotation axis as some part of the fir tree, as shown in FIG. 3, for example (i.e. the pre-swirl nozzle fully overlaps the fir tree in the direction of the rotation axis).

As mentioned above, the pre-swirl nozzle 52 is normally at the same distance as the fir tree 60 from the rotation axis 32, but may also be at a slightly different distance. For example, in FIG. 12, the pre-swirl nozzle is closer to the rotation axis 32 than the fir tree 60.

When a sealing fin 70 is provided, the pre-swirl nozzle 52 can be either side of the sealing fin or moveable sealing fin; that is, the pre-swirl nozzle can either be closer to or further away from the rotation axis 32 than the sealing fin or moveable sealing fin.

The blade 55 is split into a blade root 66 and a blade aerofoil 68. The blade root 66 comprises the fir tree 60, the sealing strips 74 and the sealing plate 76. The stator comprises vane 1, vane 2 and the rotor casing 34.

The blade shank cavity 62 generally extends between adjacent blades in the circumferential direction 10 and between the rotor and part of the blades in the radial direction 9. In the direction of the rotation axis 32, the blade shank cavity 62 normally extends the length of the fir tree 60.

The blade 1—rotor casing gap 65 extends in a radial direction 9 or a substantially radial direction. It extends between the rotor casing on one side and blade 1 on the other side. It can also extend somewhat beyond blade 1 in the radial direction, as can be seen in the Figures. Generally, as can also be seen in the Figures, the blade 1—rotor casing gap 65 extends only for this radial portion. Although there is a space that continues in the direction of the rotation axis 32 between the rotor casing and the rotor, this is the rotor cooling path rather than the blade 1—rotor casing gap. In the other direction, the blade 1—rotor casing gap 65 only extends up to the hot gas path around the aerofoil 68. The blade 1—rotor casing gap 65 also extends in the circumferential direction 10.

As can be seen in FIG. 2, there can also be a second portion of the space between the rotor 30 and the rotor casing 34 that extends in the radial direction 9, in the rotor-stator cooling air path 44. This second portion is normally spaced apart from the blade 1—rotor casing gap 65 in the direction of the rotation axis 32. The blade 1—rotor casing gap 65 and the second portion of the space are also normally separated by at least one seal 48; the seal is normally on a portion of the space extending in the direction of the rotation axis.

As mentioned above, either a moveable sealing fin (e.g. FIG. 6) or a fixed sealing fin (e.g. FIG. 3) may be used; where a fixed sealing fin is shown in the Figures, a moveable sealing fin could instead be used, and vice versa. An immovable (fixed) sealing fin can be used in cases where it is not important whether the rotor casing can be removed without first removing blade 1. When the sealing fin is a moveable sealing fin, the moveable sealing fin will normally be moveable in the axial direction, so as to allow for flexibility during maintenance. Moveable sealing fins may be provided around part of the circumference (in the circumferential direction 10), with fixed sealing fins used for the rest of the circumference. For example, sealing fins provided on the rotor casing in part or all of the lower half of the gas turbine (the portion of the rotor casing below the rotation axis when the gas turbine has been installed) may be moveable sealing fins to allow the first blades to be removed without removing the rotor casing.

The pre-swirl nozzle (near-rim pre-swirl nozzle), sealing plates at the fir tree inlet and outlet, and the sealing fin in the rotor casing can all help purge the blade 1 fir tree (stage 1 fir tree) with cooling air.

The sealing fin 70 extends in the circumferential direction, and is generally modularised. One sealing fin can be provided (in the radial direction), as in most of the examples described above, or two or more sealing fins can be provided, as shown in FIG. 12, for example. In some embodiments, the sealing fin is further from the rotation axis 32 than the fir tree 60, as this can help reduce the temperature in the gap directly adjacent to the fir tree (see FIGS. 5 and 6).

The sealing fin 70 is shown in the Figures with a tapered profile (trapezoidal profile), where the end of the sealing fin proximate to blade 1 is thinner in the radial direction 9 than the end of the sealing fin distal from blade 1. For example, the sealing fin 70 is trapezoidal in cross-section in the plane defined by the rotation axis 32 and the radial direction 9.

The honeycomb seal 72 is optional. Instead of the honeycomb seal 72, other types of seals could be used. The honeycomb seal 72 is generally at the end of the blade 1—rotor casing gap 65, at the point where the blade 1—rotor casing gap 65 opens into the hot gas path.

The sealing strips 74 can help seal the blade shank cavity 62. A sealing plate 76 is shown at the front end (the upstream end relative to the turbine gas flow direction) of the fir tree 60 in FIG. 3, and is optional. A similar sealing plate could be placed at the back end (the downstream end relative to the turbine gas flow direction) of the fir tree 60. The sealing plate normally extends across the upstream end (or front end) relative to the gas flow direction 8 of the fir tree and of the blade shank cavity so as to restrict cooling air flow to the fir tree and the blade shank cavity. The sealing plate normally comprises cooling air holes 96 through which cooling air 92 can flow to at least one of the blade shank cavity 62 and the fir tree cooling channels 63. The cooling air holes 96 and the second cooling air holes in the back end sealing plate may be circular, square, or any other suitable shape, including elongate shapes such as gaps or slots.

The hooked portion 78 is optional, as is the sealing fin 77. One or more sealing fins 77 may be provided on the sealing plate 76. The sealing fin 77 on the sealing plate 76 may be closer to the rotation axis than the sealing fins 70 on the rotor casing 34, but could also be further away. The sealing plate 76 in FIG. 12 may additionally have holes 96 as shown in FIG. 3, for example. The sealing plate 76 could be shaped to seal with the rotor 30, avoiding the need for the sealing piece 122.

The cooling air hole 79 is similar in function to the cooling air holes 96. The cooling air hole 79 may extend through the sealing plate 76 in the radial direction 9 as shown in FIG. 12, or may extend in a different direction, such as the direction of the rotation axis 32.

Only a basic idea of the position and shape of the blade cooling air channels 80 is shown in the Figures. These channels can often be of considerable complexity, feeding cooling air around the aerofoil 68.

Part of the cooling air through the rotor bore 82 could also be fed to the fir tree cooling channels 63 and/or to the blade shank cavity 62. In this case, a sealing plate is preferably included at the front end and the back end of the fir tree.

One or more assembly bolts 100 and one or more disassembly bolts 102 may be provided. In some cases, there is no need for two different types of bolt.

The moveable sealing fin in FIGS. 8 and 9 is moved by bolts, and the moveable sealing fin of FIG. 10 is moved pneumatically. These two designs are not exclusive to one another and could be combined in the same embodiment, with the pneumatic moveable sealing fin 110 attached to the moveable portion 35 of the rotor casing. This could provide a greater range of movement for the moveable sealing fin.

The pneumatic moveable sealing fin 110 may extend in the circumferential direction in a similar manner to the moveable sealing fin 70, and may also be modularised in the circumferential direction. A plurality of springs 114 may be used, spaced out in the circumferential direction.

The pneumatic moveable sealing fin 110 is an example of a type of moveable sealing fin 70. The pneumatic moveable sealing fin 110 is shown with a tapered profile in the direction of the rotation axis 32 (trapezoidal in cross-section in the plane defined by the rotation axis 32 and the radial direction 9), but could also show a rectangular or any other profile. A tapered profile may be preferred to provide a better seal between the pneumatic moveable sealing fin 110 and the rotor casing 34. The pneumatic moveable sealing fin 110 is tapered so that the end of the pneumatic moveable sealing fin in the gap 65 is thinner in the radial direction 9 than the end of the pneumatic moveable sealing fin furthest from the gap 65. Different tapering profiles could be used, including the continuously tapering example shown in FIGS. 10 and 11.

The pneumatic moveable sealing fin 110 may be near the rotor casing 34 when in use, as in FIG. 10, or may be touching the rotor casing 34. Generally, the closer the better, as this minimises cooling air leakage past the pneumatic moveable sealing fin 110. A pneumatic system containing the pneumatic moveable sealing fin 110 generally also contains a spring 114, along with the housing 112 and the holes 116 in embodiments including the housing and the holes.

The housing 112 could be other shapes than that shown in FIG. 11, and may take the form of an open framework rather than the closed structure with holes 116 shown in FIGS. 10 and 11. Its primary function is to support the spring 114 and by extension the pneumatic moveable sealing fin 110. The spring 114 could also be attached directly to the rotor casing 34, in which case the housing 112 would be unnecessary. More than one spring 114 may be provided in the radial direction 9 for the pneumatic moveable sealing fin 110.

The ribs 120 may extend across the sealing plate in the radial direction 9, as shown in FIG. 13, or may extend in the circumferential direction 10 as well. The ribs may be straight (e.g. FIG. 13) or curved (e.g. FIG. 14). More specifically, the ribs may be curved such that the angle of the ribs compared to the radial direction 9 at an end of the ribs proximal to the rotation axis 32 is greater than the angle at an end of the ribs distal from the rotation axis 32, when the sealing plate is installed in the gas turbine. Using curved ribs (FIG. 14) can increase cooling air pressure compared to radial ribs (FIG. 13).

Cooling air is described throughout the description, but other cooling fluids may be used. The cooling air for the fir tree normally needs to be at high pressure to avoid ingestion of hot gas, and the cooling air therefore normally comes from the latter stages of the compressor. This cooling air is at a relatively high temperature (typically hundreds of degrees centigrade) and therefore has relatively limited cooling potential compared to ambient uncompressed air (which is at, for example, 20 degrees centigrade).

Various modifications to the embodiments described are possible and will occur to those skilled in the art without departing from the invention which is defined by the following claims.

REFERENCE NUMERALS 1 gas turbine
2 compressor
4 combustor
6 turbine
8 gas flow direction
9 radial direction
10 circumferential direction
12 hot gas path
20 compressor vane
30 rotor
32 rotation axis
34 rotor casing
35 moveable rotor casing portion
36 rotor heat shield
40 rotor cooling air path
41 cavity
42 blade 1 internal cooling air path
43 second pre-swirl nozzle
44 rotor-stator cooling air path
46 seal
48 seal
50 stator cooling air path (rotor casing cooling air path)
52 pre-swirl nozzle
54 vane 1 (first vane)
55 blade 1 (first blade)
56 vane 2 (second vane)
57 blade 2 (second blade)
58 vane 1 root portion
60 blade 1 fir tree
61 rotated fir tree view
62 blade shank cavity (blade 1 shank cavity)
63 fir tree cooling channel
65 gap (blade 1—rotor casing gap)
68 aerofoil
70 sealing fin
72 honeycomb seal
74 sealing strips
76 sealing plate
77 sealing fin
78 hooked portion
79 cooling air hole
80 blade cooling air channel
82 rotor bore
90 cooling air
92 cooling air
94 cooling air
96 cooling air hole
100 assembly bolt (first type of bolt)
102 disassembly bolt (second type of bolt)
110 pneumatic moveable sealing fin
112 housing
114 spring
116 hole
120 rib
122 sealing piece
P1 upstream pressure
P2 downstream pressure

The invention claimed is:

1. A gas turbine comprising:
a compressor;
a combustor downstream from the compressor in a gas flow direction;
a turbine downstream from the combustor in the gas flow direction, wherein
the turbine has a rotating part and a stationary part arranged around the rotating part,
the rotating part having a rotor and a blade, the blade having a fir tree at a root end of the blade, the blade being attached to the rotor by the fir tree,
the turbine having a gap between the rotating part and the stationary part, the gap extending between the blade and the stationary part in a substantially radial direction relative to the rotation axis of the rotating part,
the gas turbine including a cooling path configured and arranged to direct a cooling fluid from the compressor to the gap, wherein at least a part of the cooling path extends in the stationary part, and wherein a pre-swirl nozzle is arranged adjacent to the gap and within the cooling path in the stationary part;
a sealing fin attached to a rotor casing, a vane or the rotating part, the sealing fin extending into the gap; and
a pneumatic system configured and arranged to move the sealing fin in the direction of the rotation axis.

2. A gas turbine comprising:
a compressor;
a combustor downstream from the compressor in a gas flow direction;
a turbine downstream from the combustor in the gas flow direction, wherein
the turbine has a rotating part and a stationary part arranged around the rotating part,
the rotating part having a rotor and a blade, the blade having a fir tree at a root end of the blade, the blade being attached to the rotor by the fir tree,
the turbine having a gap between the rotating part and the stationary part, the gap extending between the blade and the stationary part in a substantially radial direction relative to the rotation axis of the rotating part,
the gas turbine including a cooling path configured and arranged to direct a cooling fluid from the compressor to the gap, wherein at least a part of the cooling path extends in the stationary part, and wherein a pre-swirl nozzle is arranged adjacent to the gap and within the cooling path in the stationary part;
a sealing fin attached to a rotor casing, a vane or the rotating part, the sealing fin extending into the gap; and
bolts that are configured and arranged to move the sealing fin in the direction of the rotation axis.

3. The gas turbine of claim 2, wherein the bolts comprise:
a first type of bolt and a second type of bolt, configured and arranged so that when the first type of bolt is tightened it will move the sealing fin towards the blade, and when the second type of bolt is tightened it will move the sealing fin away from the blade.

4. The gas turbine of claim 1, comprising:
a sealing plate extending adjacent to the fir tree on the side of the gap opposite a rotor casing, the sealing plate having at least one hole configured and arranged to allow cooling fluid from the gap to enter a fir tree cooling channel, wherein the fir tree cooling channel is arranged between the rotor and the fir tree.

5. The gas turbine of claim 4, comprising:
at least one rib attached to the side of the sealing plate adjacent to the fir tree.

6. The gas turbine of claim 1, comprising:
a second cooling path extending between the rotor and a rotor casing, the second cooling path configured and arranged to direct cooling air to cool an aerofoil of the blade.

7. The gas turbine of claim 6, comprising:
a second pre-swirl nozzle in the second cooling path.

8. The gas turbine of claim 1, wherein the gas turbine comprises:
an external cooler, and wherein the cooling path extends through the external cooler.

9. The gas turbine of claim 1, wherein the pre-swirl nozzle is at a same distance as the fir tree from the rotation axis of the gas turbine.

10. The gas turbine according to claim 1, comprising:
a rotor casing for a gas turbine, the rotor casing being configured and arranged as the stationary part according to claim 1.

11. A method of cooling for a gas turbine, the method comprising:

providing a gas turbine having a compressor,
a combustor downstream from the compressor in a gas flow direction, and
a turbine downstream from the combustor in the gas flow direction,
the turbine having a rotating part and a stationary part arranged around the rotating part, the rotating part having a rotor and a blade, the blade having a fir tree at a root end of the blade, the blade being attached to the rotor by the fir tree, the turbine having a gap between the rotating part and the stationary part, the gap extending between the blade and the stationary part in a substantially radial direction relative to the rotation axis of the rotating part, a sealing fin attached to a rotor casing, a vane or the rotating part, the sealing fin extending into the gap;
feeding cooling fluid from the compressor to the gap through the pre-swirl nozzle; and
moving the sealing fin in the direction of the rotation axis using a pneumatic system.

12. The method of claim 11, wherein the cooling fluid is fed from the gap to at least one of a blade shank cavity adjacent to the blade, a hot gas path in the turbine and a fir tree cooling channel between the fir tree and the rotor.

* * * * *